United States Patent [19]

Bartholomew

[11] Patent Number: 5,039,072
[45] Date of Patent: Aug. 13, 1991

[54] MEANS FOR SECURING A ROLLING DIAPHRAGM ON AN AIR ADJUSTABLE SHOCK ABSORBER

[75] Inventor: Donald D. Bartholomew, Mt. Clemens, Mich.

[73] Assignee: Proprietary Technology, Inc., Southfield, Mich.

[21] Appl. No.: 465,059

[22] Filed: Jan. 16, 1990

[51] Int. Cl.⁵ .......................... F16F 9/38; B23P 11/02
[52] U.S. Cl. ............................ 267/64.24; 188/322.12; 29/451
[58] Field of Search ................ 188/322.12; 267/64.11, 267/64.22, 64.27, 122, 64.23, 64.24; 29/451

[56] References Cited

U.S. PATENT DOCUMENTS

| | | | |
|---|---|---|---|
| 3,039,760 | 6/1962 | Jackson | 267/64.24 |
| 3,797,816 | 3/1974 | Voss | 267/64.24 |
| 4,017,099 | 4/1977 | Hegel et al. | 280/707 |
| 4,392,293 | 7/1983 | Yagnaguchi et al. | 267/64.24 X |
| 4,669,757 | 6/1987 | Bartholomew | 285/55 |
| 4,683,917 | 9/1987 | Bartholomew | 138/121 |
| 4,712,776 | 12/1987 | Geno et al. | 188/322.12 X |
| 4,923,226 | 5/1990 | Bartholomew | 285/242 |

FOREIGN PATENT DOCUMENTS 2050613 4/1972 Fed. Rep. of Germany ... 267/64.27
3610144 10/1987 Fed. Rep. of Germany ... 267/64.24

Primary Examiner—Robert J. Oberleitner
Assistant Examiner—Alfred Muratori
Attorney, Agent, or Firm—Harness, Dickey & Pierce

[57] ABSTRACT

A fluid-tight coupling device comprising at least one lock sleeve to secure a flexible rolling diaphragm to a dirt shield and/or inner cylinder of an air adjustable shock absorber. The coupling device incorporates the use of tapered angles on the inner cylinder and dirt shield of the shock absorber. A tapered angle is also incorporated on the lock sleeve. The lock sleeve holds the flexible rolling diaphragm to the dirt shield and inner cylinder without the use of threads, crimps or adjustable clamping assemblies.

6 Claims, 2 Drawing Sheets

MEANS FOR SECURING A ROLLING DIAPHRAGM ON AN AIR ADJUSTABLE SHOCK ABSORBER

BACKGROUND AND SUMMARY OF THE INVENTION

The present invention generally relates to a coupling device for attaching flexible tubular members to relatively rigid tubular structures and, more particularly is concerned with a product and method for securing a rubber air sleeve to parts of an adjustable air shock absorber, in a fluid-tight manner.

It has been common practice in vehicle leveling systems that function to maintain a predetermined height relationship between the chassis of a vehicle and its axle assemblies, to utilize one or more auxiliary fluid suspension components, i.e. adjustable air shock absorbers, to assist in the load-carrying capacity along with the vehicle springs. When a load has been added to the vehicle chassis the shock absorbers operate to supplement the load carrying capacity of the springs to return the vehicle chassis to a desired height relationship with respect to the axle assembly. When the load is removed from the vehicle, the springs and the shock absorbers co-act to cause the chassis to rise above the desired height relationship which requires that the pressurized fluid be exhausted from the shock absorbers.

Current shock absorbers are basically piston cylinder devices. Due to the hostile environment in which a shock absorber operates, most shock absorbers come with a protective dirt shield which keeps foreign material from the critical piston, cylinder workings. Between the dirt shield and the outer surface of the cylinder there exists an air gap which is sealed at its open end opposite to its mounting end. This seal may be accomplished by attaching a rubber air sleeve to both the dirt shield and the cylinder. The rubber sleeve provides a flexible, rolling diaphragm which is flexible for movement and at the same time fluid-tight.

Attaching this rubber air sleeve to the dirt shield and the cylinder is the subject of the present invention. Attaching any kind of hose or tube to other members to form a reliable fluid-tight coupling has presented problems for many years. Two basic problems are axial pull off (which is simply the separation of the hose or tube from the member) and pressure or vacuum sealing of a confined media such as air or water. Most methods for accomplishing this today usually consist of one of three varieties. They are adjustable hose clamp assemblies, crimped on ferrules, and attachments that screw on by the use of threads. These methods can provide an effective way of attaching a hose or tube to a member, but they tend to be troublesome from the standpoint of providing a reliable and lasting seal. Further, it is the nature of these attaching methods to produce high, localized stresses which cause early failure.

A member having a conical shape (diamond shapes have also been used) in combination with a frusta-conical locking sleeve have been used as a means to attach a hose. Generally, the hose is thrust over the large diameter portion of the cone and seated about the reverse tapered portion of the cone. This type of hose coupling has not been totally reliable and is not often used commercially. When a hose is thick or its material is stiff and unyielding, the outer sleeve has not worked well to exert adequate pressure on the hose. Improvements were made to this type of connection by modifying the locking sleeve with threads or springs. However, it has been found that the modifications need not be made to the sleeve but to the conical shaped member. The angle of taper of the conical shaped member is particularly important because the mechanical advantage of the locking sleeve capability decreases with increasing angle.

It is desirable to provide a coupling wherein a threadless locking sleeve could be easily set or engaged by hand or machine, which would eliminate the possible need for torquing the locking sleeve. With a proper angle range only very rudimentary means of preventing tube or hose pull off or sleeve securement are required.

It is, therefore, a primary object of the present invention to provide a new and improved means for securing a flexible, rolling diaphragm to a dirt shield and inner cylinder of an air-adjustable shock absorber wherein the connection is made using smooth surfaces and a compressive friction fit that does not rely on threads, crimps, adjustable clamping assemblies. Further, the connection includes a frusta-conical shaped lock sleeve which fits over the tapered ends of the dust shield and inner cylinder of the shock absorber. The angles of the tapers of the dirt shield and the inner cylinder are between one-half degree to four degrees per side and symmetrical about the central, longitudinal axis. The angle of taper on the lock sleeve is slightly less than the angle of taper of the dirt shield or inner cylinder. This specific angle range produces locking and sealing results that make the use of threads, springs, etc. no longer necessary to achieve the same reliability. Selection of the special angle range resists any relative movement between the sleeve, flexible tube, and the shield and/or cylinder that could loosen the mechanical lock on the reverse taper or disrupt the pressure sealing integrity of the attachment. Such a configuration allows the use of a very simple locking sleeve to assure that the sleeve remains positioned on the hose or tube, and that the hose or tube remains in position on the shield and/or cylinder. The final connection may be accomplished by hand setting of the locking sleeve, or by mechanical means.

If the angle defining the sealing portion is greater than the above noted specific range, very minor distortions of wall thickness will result in greater loss of sealing. Angles larger than those specified herein are believed to cause a more rapid deterioration of sealing. Also, larger angles require more distortion of the hose or tube material. Deterioration of the tube or hose material results in more rapid loss of sealing. In commercial use, attaching methods that are not reliable, regardless of cost, are not used. The use of the special angle range results in an improvement in the reliability of the attachment that is sufficient to allow commercial utilization.

Accordingly, there is provided herein a coupling device which includes a frusta-conical locking sleeve and a tapered end of a member which cooperate to resist pull off as well as having resistance to temperature changes, resistance to vibration changes, and resistance to mechanical forces that tend to push or pull on the tube or hose in a manner that unlocks the lock sleeve or encourages leaking. The interaction of these factors generally stems from the fact that the hose or tube is flexible and will exhibit resonances of mechanical motion.

The foregoing and other advantages will become more apparent when viewed in light of the accompanying drawings and the following detailed description.

DETAILED DESCRIPTION OF THE PREFERRED EMBODIMENTS

Figure 1:
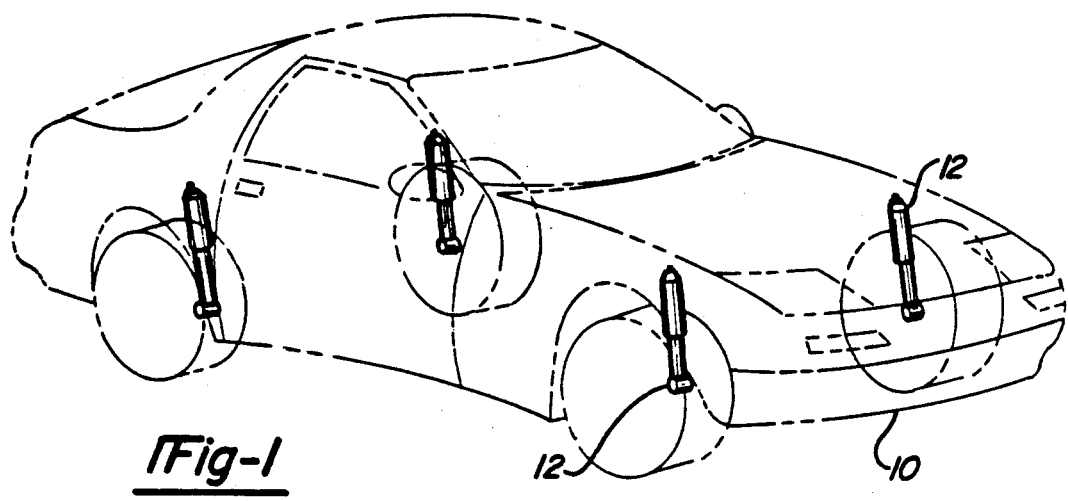
FIG. 1 is a schematic representation of one preferred embodiment of the leveling system of the present invention as shown in operative association with a typical automotive vehicle depicted in phantom lines.

Referring now in detail to the drawings, and in particular to FIG. 1 thereof, a vehicle leveling system, in accordance with one preferred embodiment of the present invention, is shown in typical operative association with an automotive vehicle representatively designated by the numeral 10. The vehicle 10 comprises a sprung portion of chassis and an unsprung or axle portion between which main or primary suspension springs (not shown) are located. Generally speaking the leveling system comprises a pair of auxiliary suspension components 12 which are adapted to be selectively pressurized.

Figure 2:
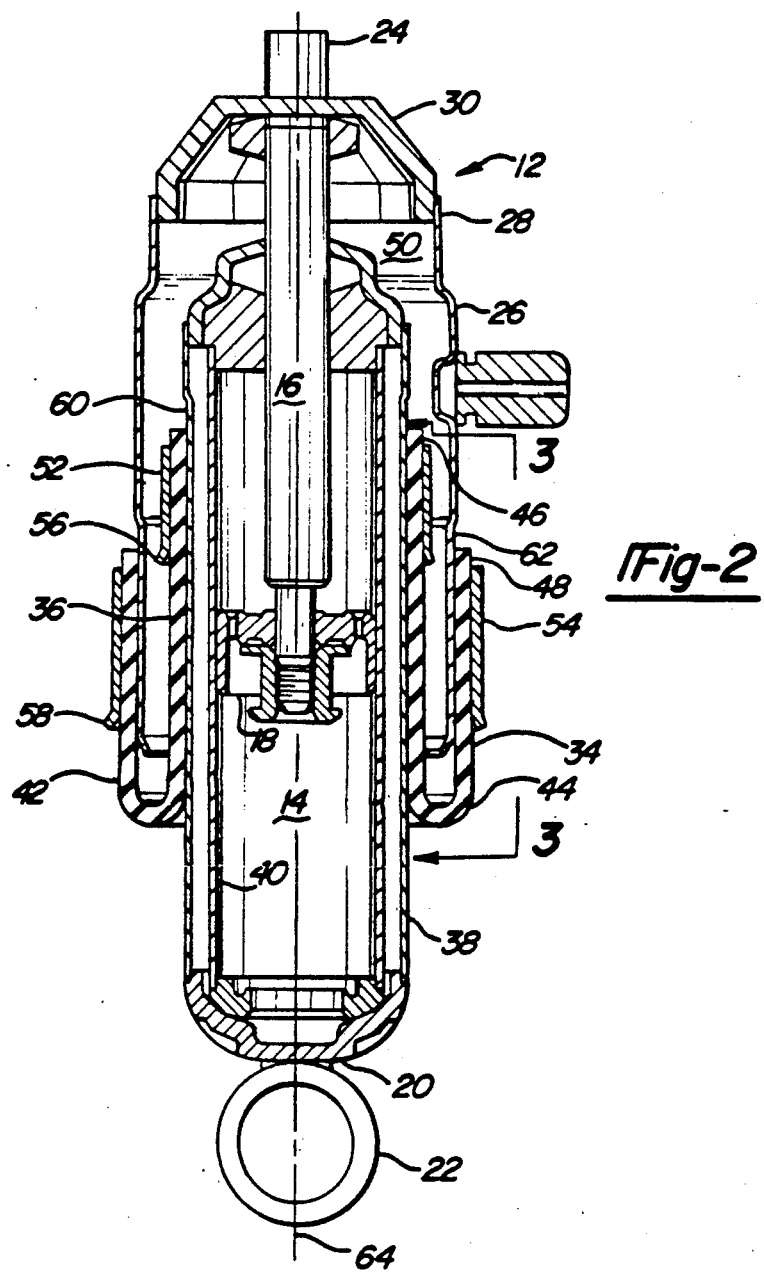
FIG. 2 is a side, elevational, section view, of an auxiliary suspension component incorporating one embodiment of the present invention.

Referring now in detail to the construction and operation of the auxiliary suspension component 12, as best seen in FIG'S. 2 and 4, the component comprises, by way of example, a direct acting hydraulic shock absorber 12 having a hydraulic cylinder 14 or housing. Extending upwardly from the cylinder 14 is a reciprocable piston rod 16 which is connected at its lower end to a piston 18 that is reciprocable with the cylinder 14. The lower end 20 of the cylinder 14 is provided with a lower end fitting 22 which is adapted to be secured in a conventional manner to the unsprung portion of the vehicle 10, while the upper end 24 of the piston rod 16 is provided with an upper end 24 fitting (not shown) adapted to be secured in a conventional manner to the sprung portion of the vehicle 10. Mounted reciprocable with the piston rod 16 is an annular dirt or dust shield member 26 which extends coaxially of the piston rod 16 and is spaced radially outwardly from the periphery of the cylinder 14. The upper end 28 of the dirt shield 26 is provided with a generally inverted cup shaped end cap 30 that is secured to the piston rod 16 and encloses the upper end 28 of the dirt shield 26. Disposed between the lower end 32 of the dirt shield 26 and the cylinder 14 is a rolling diaphragm member which in this case is a rubber air sleeve, generally designated 34. The member 34 is fabricated of a suitable flexible material, such as fabric reinforced rubber, and comprises an inner portion 36 that is sleeved over the outer periphery 38 of the cylinder 14, which in this case is a reserve tube 38. The inner portion 40 of the cylinder 14 is comprised of a pressure tube 40. The diaphragm member 34 also comprises an outer portion 42 that is sleeved over the lower end 32 of the dirt shield 26 with the inner and outer portions 36, 42 being connected by a reversely folded rolling portion 44 as illustrated in FIG. 2. The end portions 46, 48 are secured to the reserve tube 38 portion of the cylinder 14 and dirt shield 26 by the object of the present invention. The result is that the dirt shield 26 and diaphragm 34 define a pressurizable chamber 50 which is adapted to be selectively pressurized by fluid, i.e., compressed air.

The rubber air sleeve 34 may be secured to a portion of the reserve tube 38 with a first lock sleeve member 52. The other end 48 of the rubber air sleeve 34 may be secured to one end 32 of the dirt shield 26 with a second lock sleeve member 54. Both first and second lock sleeve members 52, 54 are frusta-conical shaped with a slightly tapered angle and may have one end flared 56, 58 so that when set in place the lock sleeves 52, 54 do not cut into the rubber air sleeve 34. Preferably, the lock sleeves 52, 54 should be made of a metal, such as steel.

Figure 3:
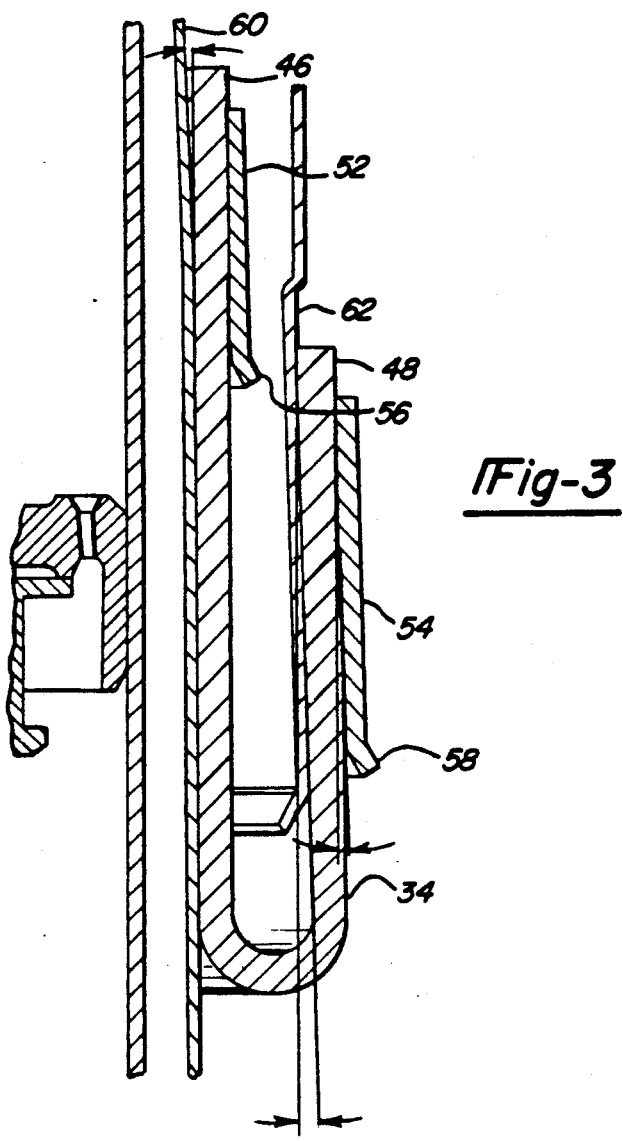
FIG. 3 is an enlarged view of a portion of FIG. 2 taken from zone 3—3.
Figure 4:
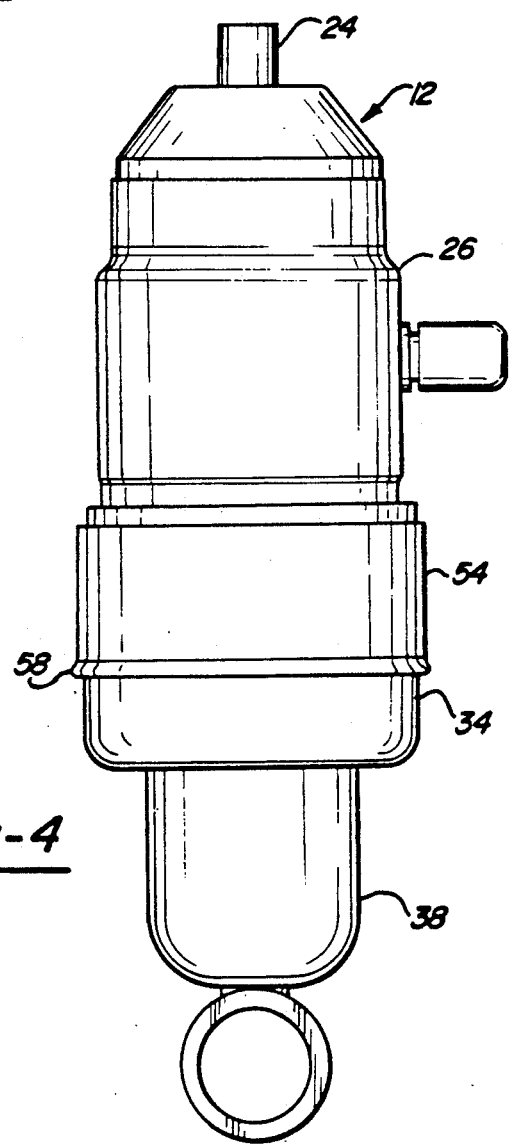
FIG. 4 is a perspective view of the exterior of an auxiliary suspension component incorporating the present invention.

As shown in FIG. 3, one portion 60 of the reserve tube 38 where the rubber air sleeve 34 is attached should be tapered at a slight angle. The same should also be true of the portion 62 of the dirt shield 26 where the rubber air sleeve 34 is attached. In the preferred embodiment of this invention the angle of taper for the portions 60, 62 of the reserve tube 38 and dirt shield 26 is about 1.5 degrees. Also in the preferred embodiment of this invention the angle of taper for the first and second lock sleeves 52, 54 is slightly less or about 1.3 degrees. Tapered angles between one-half degree and four degrees have been found to work best. The tapered angles are symmetrical about a central longitudinal axis 64.

To install the rubber air sleeve 34 in accordance with one embodiment of the present invention a lock sleeve member 52 is placed over the tapered end 60 of the reserve tube 38 and a second lock sleeve 54 is placed over the tapered end 32 of the dirt shield 26. Secondly, the rubber air sleeve 34 is inserted such a way that it fits over the reserve tube 38 and under the first lock sleeve member 52 and over the dirt shield 26 and under the second lock sleeve member 54. Then the lock sleeve members 52, 54 are set in place. This is done by simply pulling the lock sleeve members 52, 54 against the tapered angles, by hand or machine, until both lock sleeve members 52, 54 are making full contact with the rubber air sleeve 34 and the rubber air sleeve 34 is tightly held against the dirt shield 26 and reserve tube 38.

The lock sleeve concept is commercially viable because of the recognition that there is a small range of angles, that when used, provide a dramatic improvement in retention and sealing. The inherent low cost of the reverse taper locking means has made such a device potentially commercially attractive for years. It is thought that the coupling device of the present invention and many of its attendant advantages will be understood from the foregoing description and it will be apparent that various changes may be made in the form and construction of the parts thereof without departing from the spirit and scope of the invention or sacrificing all of its material advantages, the form hereinbefore described being merely a preferred or exemplary embodiment thereof.

What is claimed is:

1. A coupling device for fluid suspension components, such as an air adjustable shock absorber, comprising:

a cylinder having a tapered surface;
a shield disposed over a portion of the cylinder, the shield having a tapered surface;

a flexible diaphragm coupling the cylinder with the shield;

lock sleeve means having a relatively fixed inner diameter, for securing the flexible diaphragm to at least one of the cylinder and the shield, the lock sleeve means being operable to provide a compressive, friction fit exclusive of threads or crimps assemblies, said locksleeve means having a relatively smooth inner surface having a taper of less than the taper of the surface of the cylinder and less than the taper of the surface of the shield.

2. The coupling device of claim 1 wherein the lock sleeve means includes at least one frusta-conical shaped lock sleeve.

3. The coupling device of claim 2 wherein the cylinder is tapered at an angle of between one-half and four degrees, symmetrical about a central, longitudinal axis, in at least a section surrounded by the lock sleeve.

4. The coupling device of claim 2 wherein the lock sleeve has one end flared to protect adjacent surfaces during installation.

5. The coupling device of claim 2 wherein the shield is tapered at an angle of between one-half and four degrees, symmetrical about a central, longitudinal axis, in at least a section surrounded by the lock sleeve.

6. A fluid-tight coupling device for securing a flexible, rolling diaphragm to a dirt shield and a reserve tube cylinder of an air adjustable shock absorber, comprising:

an open end of the dirt shield and one end of the reserve tube being tapered at an angle of about one-half to four degrees, symmetrically about a central, longitudinal axis;

a first frusta-conical shaped lock sleeve of an angle slightly less than the angle of taper of the dirt shield and having one end flared, slidably secured over the diaphragm and the dirt shield, the first frusta-conical shaped lock sleeve having a smooth contracting surface operable to provide a compressive, friction fit over the diaphragm and the dirt shield, the smooth contracting surface and the diaphragm each being exclusive of threads and grooves; and a second frusta-conical shaped lock sleeve of an angle slightly less than the angle of taper of the reserve tube and having one end flared, slidably secured over the diaphragm and the reserve tube, the second frusta-conical shaped lock sleeve having a smooth contacting surface operable to provide a compressive, friction fit over the diaphragm and the reserve tube, the smooth contacting surface of the second lock sleeve and the reserve tube each being exclusive of threads and grooves.

* * * * *

UNITED STATES PATENT AND TRADEMARK OFFICE
CERTIFICATE OF CORRECTION

PATENT NO. : 5,039,072 (Page 1 of 2)
DATED : August 13, 1991
INVENTOR(S) : Donald D. Bartholomew It is certified that error appears in the above-identified patent and that said Letters Patent is hereby corrected as shown below:

Column 1, lines 59 - 60,
"frusta-conical" should be --frusto-conical--.

Column 2, line 22,
"frusta-conical" should be --frusto-conical--.

Column 2, line 59,
"frusta-conical" should be --frusto-conical--.

Column 3, line 35,
"FIG'S." should be --FIGS.--.

Column 3, line 62,
"40" should be --36--.

Column 4, line 11,
"frusta-conical" should be --frusto-conical--.

Column 5, lines 7 - 8, claim 1,
after "crimps", delete "assemblies".

Column 5, line 8, claim 1,
"locksleeve" should be --lock sleeve--.

Column 5, line 13, claim 2,
"frusta-conical" should be --frusto-conical--.

UNITED STATES PATENT AND TRADEMARK OFFICE
CERTIFICATE OF CORRECTION

PATENT NO. : 5,039,072

DATED : August 13, 1991

INVENTOR(S) : Donald D. Bartholomew

It is certified that error appears in the above-identified patent and that said Letters Patent is hereby corrected as shown below:

Column 6, line 7, claim 6,
"frusta-conical" should be --frusto-conical--.

Column 6, lines 10 - 11, claim 6,
"frusta-conical" should be --frusto-conical--.

Column 6, line 17, claim 6,
"frusta-conical" should be --frusto-conical--.

Column 6, line 21, claim 6,
"frusta-conical" should be --frusto-conical--.

Signed and Sealed this

Fifteenth Day of June, 1993

Attest:

MICHAEL K. KIRK

*Attesting Officer*     *Acting Commissioner of Patents and Trademarks*